United States Patent
Hong et al.

(10) Patent No.: US 8,488,343 B2
(45) Date of Patent: Jul. 16, 2013

(54) SWITCHING MODE POWER SUPPLY APPARATUS HAVING PASSIVE CLAMP CIRCUIT

(75) Inventors: Hyung-won Hong, Gwacheon-si (KR); Jee-hoon Jung, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 12/034,034

(22) Filed: Feb. 20, 2008

(65) Prior Publication Data

US 2009/0045790 A1 Feb. 19, 2009

(30) Foreign Application Priority Data

Aug. 13, 2007 (KR) .............................. 10-2007-81437

(51) Int. Cl.
*H02M 3/335* (2006.01)
*H02H 7/122* (2006.01)

(52) U.S. Cl.
USPC .................................... 363/21.18; 363/56.11

(58) Field of Classification Search
USPC .......... 363/21.01, 21.04, 21.18, 56.11, 56.09, 363/56.07, 56.1; 361/91.7
See application file for complete search history.

(56) References Cited

U.S. PATENT DOCUMENTS

| | | | | |
|---|---|---|---|---|
| 4,016,482 A | * | 4/1977 | Cielo et al. ................... 323/289 |
| 5,805,434 A | | 9/1998 | Vinciarelli et al. | |
| 6,104,622 A | * | 8/2000 | Shin ............................ 363/21.07 |
| 6,128,206 A | | 10/2000 | Sun et al. | |
| 6,369,552 B2 | * | 4/2002 | Goyhenetche et al. ....... 323/266 |
| 6,496,392 B2 | * | 12/2002 | Odell ......................... 363/56.11 |
| RE38,196 E | * | 7/2003 | Vinciarelli et al. ............. 363/16 |
| 7,151,680 B2 | * | 12/2006 | Nakajima et al. ............ 363/21.1 |
| 7,518,836 B2 | * | 4/2009 | Kim et al. ........................ 361/18 |
| 2002/0067624 A1 | * | 6/2002 | Nishiyama et al. ........ 363/21.01 |
| 2003/0063478 A1 | * | 4/2003 | Beranger et al. ........... 363/21.07 |
| 2003/0198064 A1 | * | 10/2003 | Zhu et al. ................... 363/21.01 |
| 2004/0080961 A1 | * | 4/2004 | Kim et al. .................. 363/21.07 |
| 2004/0155639 A1 | | 8/2004 | Mobers | |
| 2005/0073867 A1 | * | 4/2005 | Byun ............................. 363/84 |
| 2005/0111242 A1 | * | 5/2005 | Oh ............................ 363/21.07 |
| 2006/0209481 A1 | | 9/2006 | Kim et al. | |
| 2007/0183171 A1 | * | 8/2007 | Niijima ..................... 363/21.04 |
| 2008/0315858 A1 | * | 12/2008 | Hong et al. ................... 323/251 |

FOREIGN PATENT DOCUMENTS

KR 10-2001-011-065 12/2001
KR 10-2004-0014972 2/2004

OTHER PUBLICATIONS

Electus, "Optocouplers: When and How to Use Them", 2001, Electus Distribution.*
Chinese Office Action issued Jul. 10, 2012 in corresponding Chinese Patent Application No. 200810081989.8.

(Continued)

*Primary Examiner* — Adolf Berhane
*Assistant Examiner* — Jeffrey Gblende
(74) *Attorney, Agent, or Firm* — Staas & Halsey LLP

(57) ABSTRACT

A switching mode power supply apparatus includes a transformer, a main switch to adjust power supplied to a primary coil of the transformer, a passive clamp circuit to suppress a voltage stress of the main switch, and a control circuit to disable a clamping operation of the passive clamp circuit in a standby mode of the switching mode power supply apparatus. Power is not consumed in the passive clamp circuit in a standby mode so that power consumed in the standby mode can be remarkably reduced.

23 Claims, 7 Drawing Sheets

OTHER PUBLICATIONS

Korean Office Action dated Jul. 12, 2011, issued in corresponding Korean Patent Application No. 10-2007-0081437.
Chinese Office Action issued Jan. 28, 2013 in the corresponding Chinese Patent Application No. 200810081989.8.

* cited by examiner

SWITCHING MODE POWER SUPPLY APPARATUS HAVING PASSIVE CLAMP CIRCUIT

CROSS-REFERENCE TO RELATED APPLICATIONS

This application claims all benefits accruing under 35 U.S.C. §119 from Korean Patent Application No. 2007-81437, filed on Aug. 13, 2007 in the Korean Intellectual Property Office, the disclosure of which is incorporated herein by reference.

BACKGROUND OF THE INVENTION

1. Field of the Invention

Aspects of the present invention relate to a switching mode power supply apparatus, and more particularly, to a switching mode power supply apparatus having a passive clamp circuit which suppresses a voltage stress of a main switch to control power supplied to a primary coil of a transformer.

2. Description of the Related Art

In conventional switching mode power supply apparatuses, such as flyback converters, forward converters, or the like, a voltage spike is generated at both ends of a main switch by an energy stored as a leakage inductance or a magnetizing inductance of a transformer during a switching operation so that a power loss is generated and an excessive voltage stress is applied to the main switch. A clamp circuit that forms a path for discharging the energy stored as the leakage inductance or the magnetizing inductance is used to suppress such voltage stress. By using the clamp circuit, a power loss of a switching device can be prevented from occurring by the energy stored as the leakage inductance or the magnetizing inductance.

Among various clamp circuits, passive clamp circuits comprising a clamping diode, a clamping capacitor, and a resistor have been widely used. Such passive clamp circuits are referred to as RCD (Resistor-Capacitor-Diode) clamp circuits. Such passive clamp circuits have simple structures and low manufacturing costs.

When the passive clamp circuits are used, a magnetizing energy is consumed by the resistor of the passive clamp circuit during a clamping operation. In a standby mode in which the power consumption of the switching mode power supply apparatus is greatly reduced, power consumed by the resistor of the passive clamp circuit takes a greatest portion of the power consumed in the entire switching mode power supply apparatus. As a result, there is a limitation in reducing standby power.

SUMMARY OF THE INVENTION

Aspects of the present invention provide a switching mode power supply apparatus having a passive clamp circuit in which power is not consumed in a standby mode so that the overall power consumed by the switching mode power supply apparatus in the standby mode can be remarkably decreased.

Additional aspects and/or advantages of the invention will be set forth in part in the description which follows and, in part, will be obvious from the description, or may be learned by practice of the invention.

According to an aspect of the present invention, there is provided a switching mode power supply apparatus including a transformer; a main switch to adjust power supplied to a primary coil of the transformer; a passive clamp circuit to suppress a voltage stress of the main switch; and a control circuit to disable a clamping operation of the passive clamp circuit in a standby mode of the switching mode power supply apparatus.

According to aspects of the present invention, the apparatus may further include a switch to switch on or off the passive clamp circuit, and the control circuit may switch off the switch in the standby mode to disable the clamping operation. According to aspects of the present invention, the switch may be implemented using a photocoupler.

According to aspects of the present invention, the passive clamp circuit may include a clamping diode, a clamping capacitor, and a resistor. According to aspects of the present invention, the clamping capacitor and the resistor may be connected to each other in parallel, and the clamping diode may be connected in series to the parallel clamping capacitor and the resistor.

According to aspects of the present invention, the switch may be connected between the main switch and the clamping diode, or may be connected between the clamping diode and the parallel clamping capacitor and the resistor, or may be connected between a terminal of an input voltage supplied to the primary coil and the parallel clamping capacitor and the resistor.

According to aspects of the present invention, the control circuit may generate a control signal to disable the clamping operation of the passive clamp circuit according to an output voltage of an output circuit connected to a secondary coil of the transformer. According to aspects of the present invention, the control circuit may compare the output voltage with a predetermined reference voltage and generate a control signal to disable the clamping operation of the passive clamp circuit according to the comparison result.

According to aspects of the present invention, the control circuit may generate a control signal to disable the clamping operation of the passive clamp circuit according to a current flowing through the main switch. According to aspects of the present invention, the control circuit may compare a voltage across the resistor connected to the switching element with a predetermined reference voltage and generate a control signal to disable the clamping operation of the passive clamp circuit according to the comparison result.

According to aspects of the present invention, the control circuit may generate a control signal disable the operation of the passive clamp circuit according to a signal that is generated from the outside of the switching mode power supply apparatus and indicates the standby mode.

According to another aspect of the present invention, there is provided a switching mode power supply method comprising: determining whether a switching mode power supply apparatus is in a standby mode; and if the switching mode power supply apparatus is in the standby mode as the comparison result, disabling a clamping operation of a passive clamp circuit of the switching mode power supply apparatus.

In addition to the example embodiments and aspects as described above, further aspects and embodiments will be apparent by reference to the drawings and by study of the following descriptions.

BRIEF DESCRIPTION OF THE DRAWINGS

A better understanding of the aspects of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

The above and other features and advantages of the present invention will become more apparent by describing in detail exemplary embodiments thereof with reference to the attached drawings in which.

DETAILED DESCRIPTION OF THE EMBODIMENTS

Figure 1:
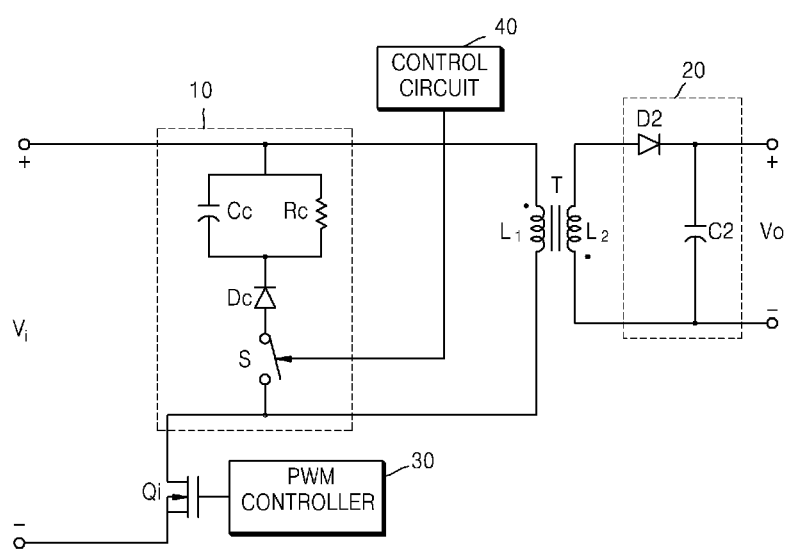
FIG. 1 is a circuit diagram of a switching mode power supply apparatus according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Aspects of the present invention will now be described more fully with reference to the accompanying drawings, in which exemplary embodiments of the invention are shown. Like reference numerals in the drawings denote like elements, and thus their description will be omitted. In addition, when it is determined that related well-known functions or the detailed description of a construction when describing the aspects of the present invention may make the key point of the present invention ambiguous, a detailed description thereof will be omitted.

FIG. 1 is a circuit diagram of a switching mode power supply apparatus according to an embodiment of the present invention. In the present embodiment, a switching mode power supply apparatus having one output will be described. However, the switching mode power supply apparatus may be constructed to output N output powers (where N is a natural number) according to operational circumstances and requirements. If there are N outputs, a transformer comprises N secondary coils, and secondary output circuits may be connected to the N secondary coils, respectively.

As illustrated in FIG. 1, the switching mode power supply apparatus comprises a transformer T, which includes a primary coil L1 and a secondary coil L2 that has a predetermined winding ratio with respect to the primary coil L1. A primary circuit is connected to the primary coil L1, and an output circuit is connected to the secondary coil L2. Here, the primary circuit and the output circuit are insulated from each other by the transformer T.

The primary circuit comprises a main switch Qi, a pulse width modulation (PWM) controller 30, which controls the main switch Qi using a PWM signal, and a passive clamp circuit 10, which performs a clamping operation so as to suppress a voltage stress of the main switch Qi.

The main switch Qi performs a switching operation in response to the PWM signal applied to the main switch Qi by the PWM controller 30 in order to control an energy charging or transfer operation of the transformer T. The main switch Qi may be implemented by a metal oxide semiconductor field effect transistor (MOSFET), as illustrated in FIG. 1, but is not limited thereto. The PWM controller 30 may feed back the output voltage of the output circuit to control the switching operation of the main switch Qi.

The output circuit comprises a rectifier 20 which rectifies power transferred to the secondary coil L2 of the transformer T. According to aspects of the present invention, the rectifier 20 is implemented as a half-wave rectifier circuit including a diode D2 and a capacitor C2; however, the rectifier 20 is not limited thereto such that an other type rectifier circuit, such as a full-wave rectifier circuit, may be used. An output terminal, outputting an output voltage Vo, may be formed at both ends of the capacitor C2.

The passive clamp circuit 10 is constructed to perform a clamping operation and comprises a clamping diode Dc, a clamping capacitor Cc, a resistor Rc, and a switch S, which switches the passive clamp circuit 10 on or off. Referring to FIG. 1, the clamping capacitor Cc and the resistor Rc are connected to each other in parallel. One end of each of the clamping capacitor Cc and the resistor Rc is connected to a positive terminal of an input voltage Vi, and the other ends each of the clamping capacitor Cc and the resistor Rc are connected to a negative terminal of the clamping diode Dc. An anode terminal of the clamping diode Dc is connected to a drain terminal of the main switch Qi over the switch S.

A clamping operation performed by the clamping diode Dc, the clamping capacitor Cc, and the resistor Rc is as follows. That is, while the clamping diode Dc is switched on by the switch S, a current flows through the passive clamp circuit 10, and a voltage at both ends of the main switch Qi is fixed as a value which is obtained by adding the input voltage Vi and the voltage at both ends of the clamping capacitor Cc. In addition, when the clamping diode Dc is switched off by the switch S, a magnetizing energy stored in the clamping capacitor Cc while the clamping diode Dc is switched on is consumed in the resistor Rc. The clamping operation is performed while the switch S is switched on. When the switch S is switched off, a current does not flow through the passive clamp circuit 10, and thus, the clamping operation is not performed.

A control circuit 40 switches on the switch S in a normal operation mode of the switching mode power supply apparatus and switches off the switch S in a standby mode. As a result, the control circuit 40 enables the clamping operation of the passive clamp circuit 10 in the normal operation mode and disables the clamping operation of the passive clamp circuit 10 in the standby mode. The switch S may be implemented using a photocoupler, a bipolar junction transistor (BJT), a metal oxide semiconductor field effect transistor (MOSFET), or the like. If the switch S is implemented using the photocoupler, the control circuit 40 may comprise a photodiode, and the switch S may be a phototransistor.

The standby mode of the switching mode power supply apparatus is a mode that is set to consume minimum power and may be the case where a very small load is applied to the output terminal of the output circuit or the case where a standby mode is set according to a control signal output from a control device, such as a microcomputer disposed outside the switching mode power supply apparatus, i.e., an external control device.

Figure 2:
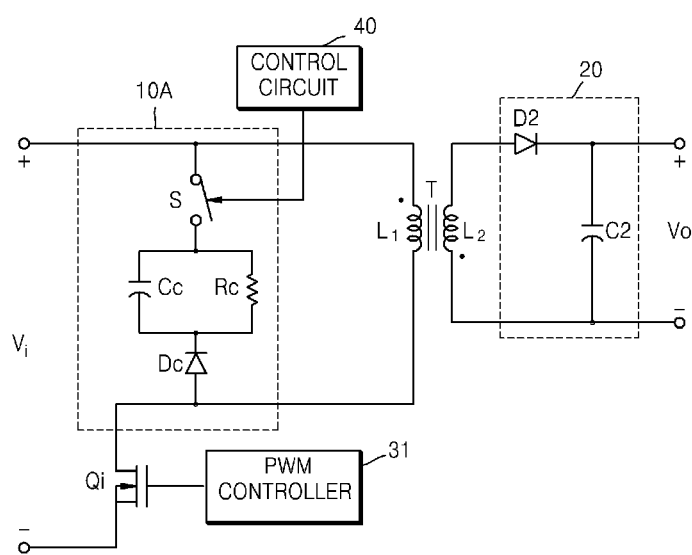
FIG. 2 is a circuit diagram of a switching mode power supply apparatus according to another embodiment of the present invention.

FIG. 2 is a circuit diagram of a switching mode power supply apparatus according to another embodiment of the present invention. Referring to FIG. 2, the switching mode power supply apparatus according to the present embodiment is different from the switching mode power supply apparatus illustrated in FIG. 1 in view of the position of a switch for switching on or off a passive clamp circuit. That is, a switch S to switch on or off the passive clamp circuit 10A is connected between a positive terminal of an input voltage Vi and a clamping capacitor Cc and a resistor Rc, which are connected to each other in parallel. The other constructions and the detailed operation of the switching mode power supply apparatus are substantially the same as those of the switching mode power supply apparatus illustrated in FIG. 1 and thus, a description thereof will be omitted.

Figure 3:
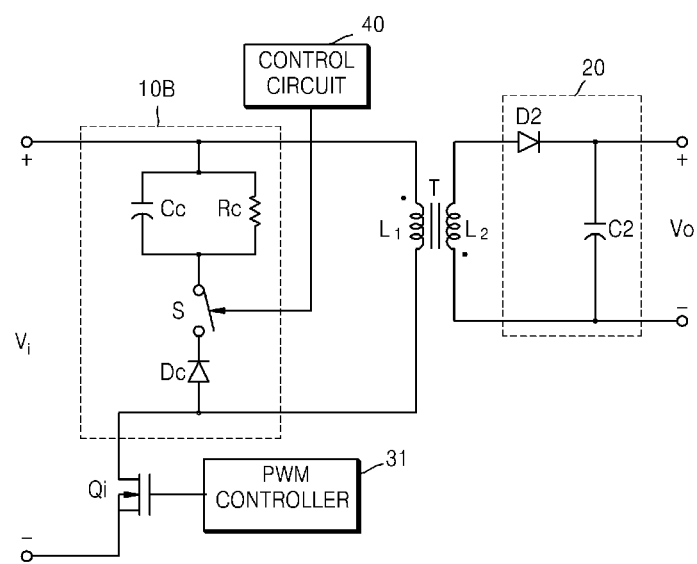
FIG. 3 is a circuit diagram of a switching mode power supply apparatus according to another embodiment of the present invention.

FIG. 3 is a circuit diagram of a switching mode power supply apparatus according to another embodiment of the present invention. Referring to FIG. 3, the switching mode power supply apparatus according to the present embodiment is different from the switching mode power supply apparatus illustrated in FIGS. 1 and 2 in view of the position of a switch for switching on or off a passive clamp circuit. That is, a switch S to switch on or off the passive clamp circuit 10B is connected between a clamping capacitor Cc, a resistor Rc, and a diode Dc, which are connected to one another in parallel. The other constructions and the detailed operation of the switching mode power supply apparatus are substantially the same as those of the switching mode power supply apparatus illustrated in FIG. 1 and thus, a description thereof will be omitted.

Figure 4:
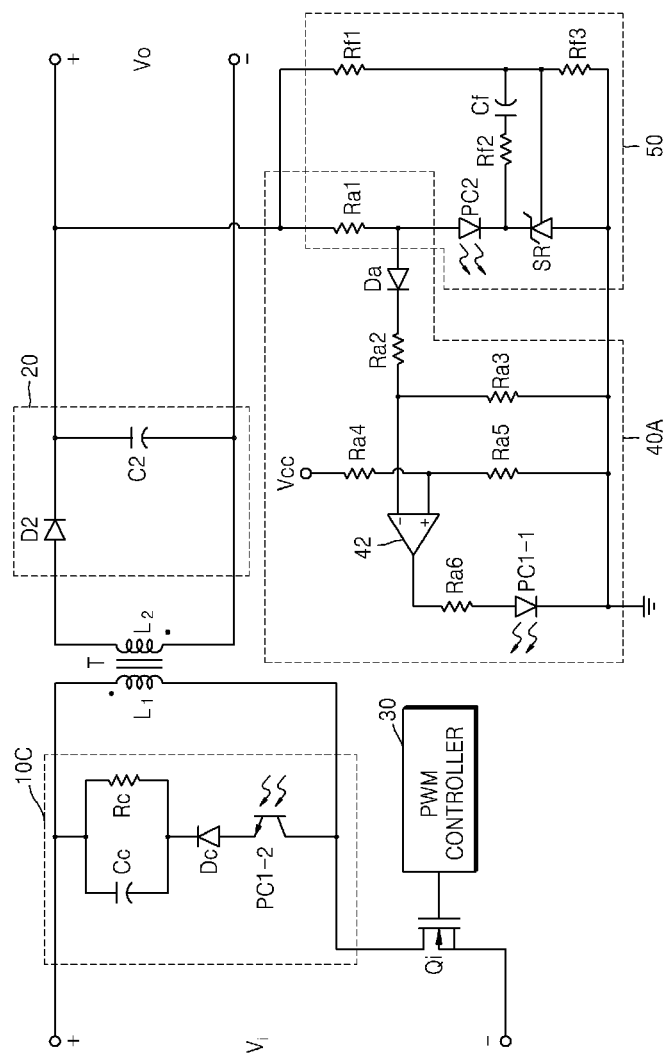
FIG. 4 is a circuit diagram of a switching mode power supply apparatus including a control circuit according to an embodiment of the present invention.

FIG. 4 is a circuit diagram of a switching mode power supply apparatus including a control circuit 40 according to an embodiment of the present invention. A control circuit 40A according to the present embodiment generates a control signal to enable or disable the clamping operation of the passive clamp circuit 10 according to an output voltage Vo of an output circuit. As described previously, when a very small load is applied to an output terminal of the output circuit, the switching mode power supply apparatus is in a standby mode. The smaller the load applied to the output terminal, the higher an output voltage is. In the present embodiment, the control circuit 40A is implemented to disable the operation of the passive clamp circuit 10 if the output voltage is more than a predetermined voltage.

The control circuit 40A comprises a resistor Ra1, one end of which is connected to the output terminal of the output circuit, a diode Da, having the anode connected to the other end of the resistor Ra1, a resistor Ra2, one end of which is connected to a cathode of the diode Da, a resistor Ra3 which is connected between the other end of the resistor Ra2 and a ground, a resistor Ra4, one end of which is connected to a supply voltage Vcc, a resistor Ra5, which is connected between the other end of the resistor Ra4 and the ground, a comparator 42, having the (−) terminal connected to other end of the resistor Ra2 and the (+) terminal connected to one end of the resistor Ra5, a resistor Ra6, one end of which is connected to an output terminal of the comparator 42, and a photodiode PC1-1, having an anode connected to other end of the resistor Ra6 and the cathode connected to the ground.

A more detailed operation of the control circuit 40A according to the present embodiment will now be described with reference to FIG. 4. In the present embodiment, the switch S is implemented using a photocoupler comprising the photodiode PC1-1 and a phototransistor PC1-2.

The output voltage Vo is detected as a predetermined voltage ratio by the resistors Ra1, Ra2, and Ra3, and the output voltage Vo is supplied to the (−) terminal of the comparator 42. The diode Da prevents a current from flowing through the output terminal of the output circuit from the comparator 42. The supply voltage Vcc is divided into two by the resistors Ra4 and Ra5 so that a predetermined reference voltage is supplied to the (+) terminal of the comparator 42. If the output voltage Vo detected as the predetermined voltage ratio is smaller than the predetermined reference voltage, a current flows through the resistor Ra6 connected to the output terminal of the comparator 42 and the photodiode PC1-1. Upon current flowing through the resistor Ra6, the photodiode PC1-1 emits light and the phototransistor PC1-2 is switched on. However, if the output voltage Vo detected as the predetermined voltage ratio is larger than the predetermined reference voltage, a current does not flow through the output terminal of the comparator 42. When current does not flow through the output terminal of the comparator 42, the photodiode PC1-1 does not emit light and the phototransistor PC1-2 is switched off. Thus, if the output voltage Vo is higher than a predetermined voltage, the phototransistor PC1-2 is switched off and the clamping operation of the passive clamp circuit 10 is disabled.

An output voltage feedback circuit 50 feeds back information about the output voltage Vo to the PWM controller 30. The output voltage feedback circuit 50 comprises a resistor Ra1, one end of which is connected to the output terminal of the output circuit, a photodiode PC2, having an anode connected to other end of the resistor Ra1, a shunt regulator SR, having a cathode connected to a cathode of the photodiode PC2 and an anode connected to a ground, a resistor Rf1, which is connected between the output terminal of the output circuit and a reference terminal of the shunt regulator SR, a resistor Rf3, which is connected between the reference terminal of the shunt regulator SR and the ground, and a resistor Rf2 and a capacitor Cf, which are connected in series between the cathode of the photodiode PC2 and one end of the resistor Rf3. Due to such a construction, the photodiode PC2 outputs a signal corresponding to information about the output voltage, and although not shown, the signal is transmitted to the PWM controller 30 via a phototransistor combined with the photodiode PC2.

Figure 5:
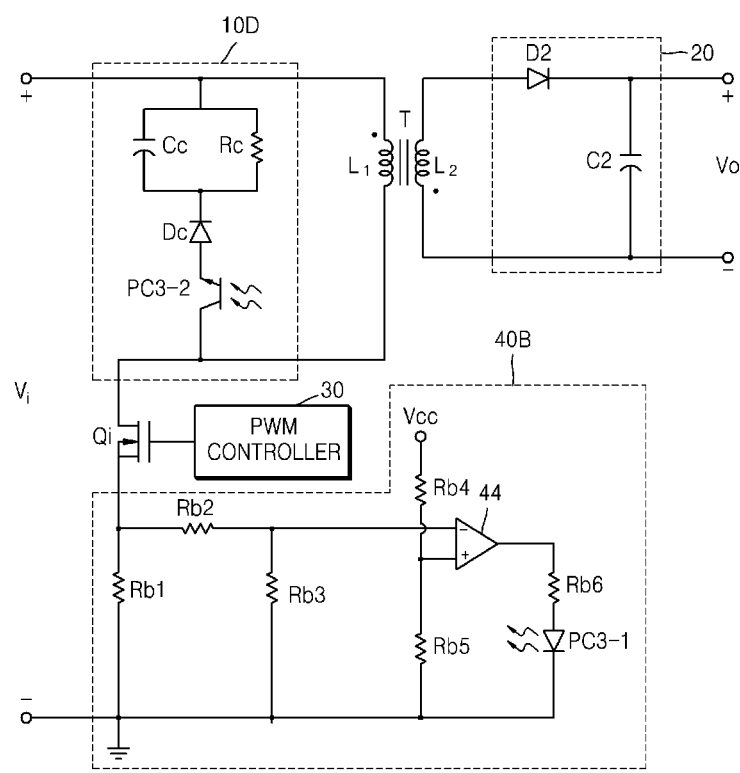
FIG. 5 is a circuit diagram of a switching mode power supply apparatus including a control circuit according to another embodiment of the present invention.

FIG. 5 is a circuit diagram of a switching mode power supply apparatus including a control circuit 40 according to another embodiment of the present invention. A control circuit 40B according to the present embodiment generates a control signal to enable or disable the clamping operation of the passive clamp circuit 10 according to a current flowing through a primary circuit, i.e., a current flowing through a main switch Qi. When the switching mode power supply apparatus is in a standby mode, the current flowing through the primary circuit is greatly reduced. Thus, a resistor Rb1 is disposed between the main switch Qi and the ground so as to detect the current flowing through the main switch Qi. In this case, the smaller the current flowing through the main switch Qi, the smaller a voltage applied to both ends of the resistor Rb1. In the present embodiment, if the voltage applied to both ends of the resistor Rb1 is smaller than a predetermined voltage, the operation of the passive clamp circuit 10 can be disabled.

The control circuit 40B comprises a resistor Rb1, one end of which is connected to the main switch Qi and the other end of which is connected to the ground, a resistor Rb2, one end of which is connected to the one end of the resistor Rb1, a resistor Rb3 which is connected between the other end of the resistor Rb2 and the ground, a resistor Rb4, one end of which is connected to a supply voltage Vcc, a resistor Rb5 which is connected between the other end of the resistor Rb4 and the ground, a comparator 44 having the (−) terminal connected to the other end of the resistor Rb2 and the (+) terminal connected to the other end of the resistor Rb4, a resistor Rb6, one end of which is connected to an output terminal of the comparator 44, and a photodiode PC3-1 having an anode connected to the other end of the resistor Rb6 and a cathode connected to the ground.

A more detailed operation of the control circuit 40B according to the present embodiment will now be described with reference to FIG. 5. In the present embodiment, the switch S is implemented using a photocoupler comprising the photodiode PC3-1 and a phototransistor PC3-2. However, the switch S is not limited thereto.

The voltage applied to both ends of the resistor Rb1 is detected as a predetermined voltage ratio by the resistors Rb2 and Rb3 and is supplied to the (+) terminal of the comparator 44. The supply voltage Vcc is divided into two by the resistors Rb4 and Rb5 so that a predetermined reference voltage is supplied to the (−) terminal of the comparator 44. If the voltage detected as the predetermined voltage ratio and applied to both ends of the resistor Rb1 is higher than the predetermined reference voltage, a current flows through the resistor Rb6 connected to the output terminal of the comparator 44 and the photodiode PC3-1. Thus, the photodiode PC3-1 emits light and the phototransistor PC3-2 is switched on. However, if the voltage detected as the predetermined voltage ratio and applied to both ends of the resistor Rb1 is smaller than the predetermined reference voltage, a current does not flow through the output terminal of the comparator 44. Thus, the photodiode PC3-1 does not emit light and the phototransistor PC3-2 is switched off. Thus, if the voltage applied to both ends of the resistor Rb1 is smaller than a predetermined voltage, that is, if the current flowing through the main switch Qi is smaller than a predetermined current, the phototransistor PC3-2 is switched off and the clamping operation of the passive clamp circuit 10 is disabled.

Figure 6:
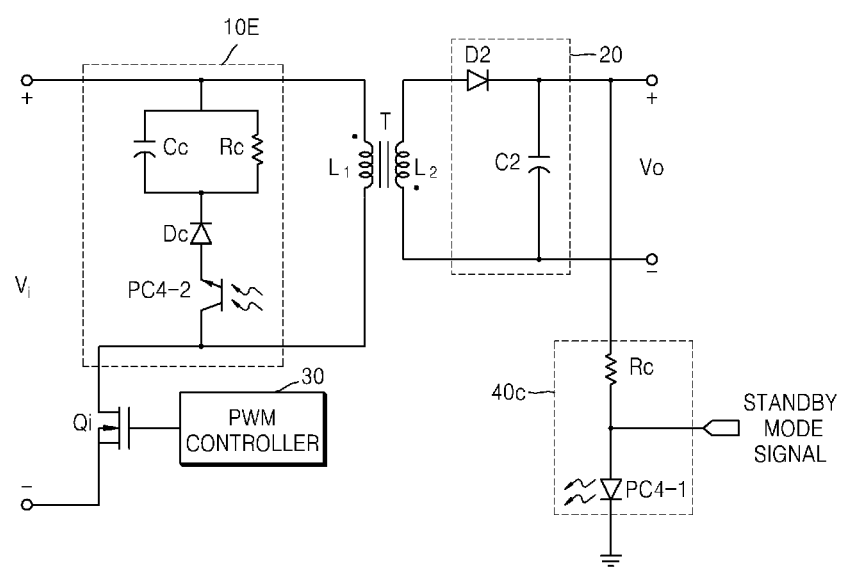
FIG. 6 is a circuit diagram of a switching mode power supply apparatus including a control circuit according to another embodiment of the present invention.

FIG. 6 is a circuit diagram of a switching mode power supply apparatus including a control circuit 40 according to another embodiment of the present invention. A control circuit 40C according to the present embodiment generates a control signal to enable or disable the clamping operation of the passive clamp circuit 10 according to a control signal output from a control device, such as a microcomputer disposed outside the switching mode power supply apparatus.

A standby mode signal illustrated in FIG. 6 is a signal which is generated in the control device disposed outside the switching mode power supply apparatus and indicates whether a current mode is a standby mode. For example, if the standby mode signal is in a high state, state standby mode signal indicates a normal operation state, and if the standby mode signal is in a low state, the standby mode signal indicates a standby mode state.

A control circuit 40C comprises a resistor Rc, one end of which is connected to one end of an output terminal of an output circuit and other end of which is connected to a standby mode signal output terminal of the control device, and a photodiode PC4-1 with an anode connected to the other end of the resistor Rc and a cathode connected to the ground.

A more detailed operation of the control circuit 40C according to the present embodiment will now be described with reference to FIG. 6. In the present embodiment, the switch S is implemented using a photocoupler comprising the photodiode PC4-1 and a phototransistor PC4-2; however, the switch S is not limited thereto. If the standby mode signal is in a high state indicative of a normal operation state, a current flows through the photodiode PC4-1, the photodiode PC4-1 emits light, and the phototransistor PC4-2 is switched on. However, if the standby mode signal is in a low state indicative of a standby mode state, a current does not flow through the photodiode PC4-1, the photodiode PC4-1 does not emit light, and the phototransistor PC1-2 is switched off. Thus, when the standby mode signal outputted from the control device disposed outside the switching mode power supply apparatus indicates the standby mode state, the phototransistor PC4-2 is switched off and the clamping operation of the passive clamp circuit 10 is disabled.

Figure 7:
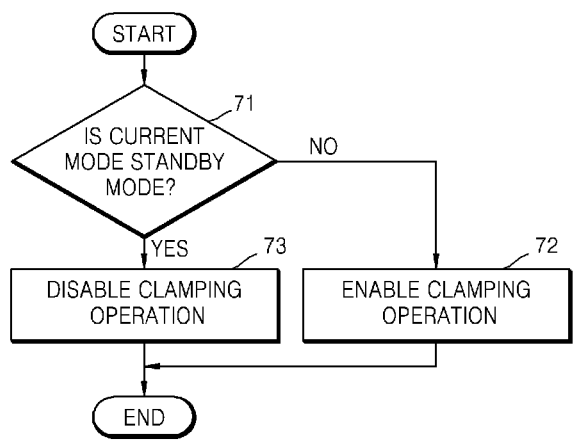
FIG. 7 is a flowchart of a switching mode power supply method according to an embodiment of the present invention.

FIG. 7 is a flowchart of a switching mode power supply method according to an embodiment of the present invention. Referring to FIG. 7, the switching mode power supply method according to the present embodiment comprises operations which are processed in a time sequence in the control circuits 40A, 40B, 40C illustrated in FIGS. 4 through 6. Thus, the above descriptions of the control circuits 40A, 40B, 40C illustrated in FIGS. 4 through 6 are also valid in case of the switching mode power supply method according to the present embodiment.

In operation 71, the control circuit 40 determines whether a current mode is a standby mode. The standby mode is a mode wherein a minimum amount of power is consumed. The control circuit 40 determines the case where a very small load is applied to an output terminal of an output circuit (i.e., FIGS. 4 and 5) or the case where a standby mode is set according to a control signal outputted from a control device, such as a microcomputer disposed outside the switching mode power supply apparatus (i.e., FIG. 6), as the standby mode.

In operation 72, if it is determined in operation 71 that the current mode is a normal mode (not the standby mode), the control circuit 40 switches on a switch S, PC1-2, PC3-2, PC4-2 to enable the clamping operation of a passive clamp circuit 10, 10A, 10B, 10C, 10D, 10D.

In operation 73, if it is determined in operation 71 that the current mode is the standby mode, the control circuit 40 switches off the switch S, PC1-2, PC3-2, PC4-2 to disable the clamping operation of the passive clamp circuit 10, 10A, 10B, 10C, 10D, 10E.

As described above, according to aspects of the present invention, the clamping operation of a passive clamp circuit is not performed in a standby mode of the switching mode power supply apparatus such that a current does not flow through the resistor of the passive clamp circuit. Thus, since power is not consumed in the passive clamp circuit, the power consumed in the switching mode power supply apparatus can be remarkably reduced.

Since a current flowing through the primary circuit in the standby mode is very small, an energy stored as a leakage inductance or a magnetizing inductance of a transformer is very small and a voltage spike generated at both ends of a main switch is sufficiently small. Thus, even though the clamping operation of the passive clamp circuit is not performed in the standby mode, the voltage stress of the switching element is not generated. Like this, according to aspects of the present invention, the passive clamp circuit performs the clamping operation in the normal operation state of the switching mode power supply apparatus so that the voltage stress of the main switch can be suppressed, and the clamping operation of the passive clamp circuit is disabled in the standby mode so that power consumption in the standby mode can be remarkably reduced.

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. For example, although the switches are sometimes described as a MOSFET or a photocoupler, the switches are not limited thereto such that the switches may be any form of controllable current interruption device. Accordingly, it is intended, therefore, that the present invention not be limited to the various example embodiments disclosed, but that the present invention includes all embodiments falling within the scope of the appended claims.

What is claimed is:

1. A switching mode power supply apparatus, comprising:
    a transformer having a primary coil connected to a power supply source and a secondary coil connected to an output circuit;
    a main switch to control power supplied from the power supply source to the primary coil of the transformer;
    a passive clamp circuit coupled to the main switch and the primary coil of the transformer to perform a clamping operation so as to suppress a voltage stress of the main switch;
    a switch coupled to the passive clamp circuit; and
    a control circuit to switch on the switch in a normal mode to enable the clamping operation of the passive clamp circuit and to switch off the switch in a standby mode to disable the clamping operation of the passive clamp circuit such that power is consumed in the passive clamp circuit, the switch always being on in a normal mode and always being off in a standby mode,
    wherein the main switch controlling the supplied power is independent with the switch at both of the standby mode and the normal mode, the standby mode of the switching mode power supply apparatus is a mode consuming a minimum non-zero power, and
    the main switch is always switching on/off for maintaining a turn-on state of the switching mode power supply apparatus in both of the normal mode and the standby mode.

2. The apparatus of claim 1, wherein the switch comprises a photocoupler.

3. The apparatus of claim 1, wherein the passive clamp circuit comprises:
    a clamping capacitor and a resistor connected in parallel; and
    a clamping diode connected to the main switch;
    wherein the resistor consumes energy stored in the clamping capacitor when the clamping diode is switched on.

4. The apparatus of claim 1, wherein the passive clamp circuit comprises:
    a clamping capacitor and a resistor connected in parallel; and
    a clamping diode connected in series with the parallel clamping capacitor and resistor.

5. The apparatus of claim 4, wherein the switch is connected between the main switch and the clamping diode.

6. The apparatus of claim 4, wherein the switch is connected between the clamping diode and the parallel clamping capacitor and resistor.

7. The apparatus of claim 4, wherein the switch is connected between a terminal of a voltage input that supplies voltage to the primary coil and the parallel clamping capacitor and resistor.

8. The apparatus of claim 1, wherein the control circuit generates a control signal to control the switch to disable the clamping operation of the passive clamp circuit according to an output voltage of the output circuit.

9. The apparatus of claim 8, wherein the control circuit compares the output voltage with a predetermined reference voltage and generates the control signal to control the switch to disable the clamping operation of the passive clamp circuit according to the comparison result.

10. The apparatus of claim 9, wherein the control circuit switches off the switch to disable the clamping operation if the output voltage is greater than the predetermined reference voltage.

11. The apparatus of claim 1, wherein the control circuit generates a control signal to control the switch to disable the clamping operation of the passive clamp circuit according to a current flowing through the main switch.

12. The apparatus of claim 11, wherein the control circuit further comprises:
    a resistor connected to the main switch and a voltage source,
    wherein the control circuit compares voltage across the resistor with a predetermined reference voltage and generates a control signal to control the switch to disable the clamping operation of the passive clamp circuit according to the comparison result.

13. The apparatus of claim 12, wherein the control circuit generates a control signal to control the switch to disable the clamping operation if the voltage across the resistor is less than the predetermined reference voltage.

14. The apparatus of claim 1, wherein the control circuit generates a control signal to control the switch to disable the operation of the passive clamp circuit according to a signal that is generated from outside of the switching mode power supply apparatus that indicates the standby mode.

15. The apparatus of claim 1, further comprising a pulse width modulation controller to control the main switch.

16. The apparatus of claim 1, wherein the output circuit is a rectifier.

17. The apparatus of claim 16, wherein the rectifier is a half-wave rectifier circuit.

18. A switching mode power supply method, comprising:
    controlling power by a main switch being independent with a switch at both of a standby mode and a normal mode, the standby mode of a switching mode power supply apparatus being a mode consuming a minimum non-zero power;
    determining whether the switching mode power supply apparatus is in the standby mode; and
    disabling a clamping operation of a passive clamp circuit of the switching mode power supply apparatus if the switching mode power supply apparatus is in the standby mode such that power is consumed in the passive clamp circuit, the switch always being on in a normal mode and always being off in a standby mode,
    wherein the main switch is always switching on/off for maintaining a turn-on state of the switching mode power supply apparatus in both of the normal mode and the standby mode.

19. The method of claim 18, further comprising:
    enabling the clamping operation of the passive clamp circuit if the switching mode power supply apparatus is not in the standby mode.

20. The method of claim 18, wherein the determining of the standby mode comprises:
    determining an output voltage of a switching mode power supply apparatus; and
    comparing the determined output voltage with a predetermined reference voltage.

21. The method of claim 20, the disabling of the clamping operation comprises:
   generating a signal to turn off a switch of the passive clamp circuit if the determined output voltage is greater than the predetermined reference voltage to disable the clamping operation of the passive clamp circuit.

22. The method of claim 18, wherein the determining of the standby mode comprises:
   determining a current flowing through a main switch of the switching mode power supply apparatus;
   determining a corresponding voltage that corresponds to the determined current; and
   comparing the determined corresponding voltage with a predetermined reference voltage.

23. The method of claim 22, the disabling of the clamping operation comprises:
   generating a signal to turn off a switch of the passive clamp circuit if the determined corresponding voltage is less than the predetermined reference voltage to disable the clamping operation of the passive clamp circuit.

* * * * *

UNITED STATES PATENT AND TRADEMARK OFFICE
CERTIFICATE OF CORRECTION

| | | |
|---|---|---|
| PATENT NO. | : 8,488,343 B2 | Page 1 of 1 |
| APPLICATION NO. | : 12/034034 | |
| DATED | : July 16, 2013 | |
| INVENTOR(S) | : Hyung-won Hong et al. | |

It is certified that error appears in the above-identified patent and that said Letters Patent is hereby corrected as shown below:

On the Title Page, In Column 2 item 56 (Foreign Patent Documents), Line 1, Delete "10-2001-001-065" and insert -- 10-2001-0010658 --, therefor.

Signed and Sealed this
Eighteenth Day of February, 2014

Michelle K. Lee
*Deputy Director of the United States Patent and Trademark Office*